United States Patent
Li et al.

(10) Patent No.: US 10,117,175 B2
(45) Date of Patent: *Oct. 30, 2018

(54) MOBILITY AND CONNECTION MANAGEMENT OF LOW POWER WIRELESS COMMUNICATIONS APPARATUSES

(71) Applicant: Fujitsu Limited, Kawasaki-shi, Kanagawa (JP)

(72) Inventors: Zhaojun Li, Surrey (GB); Hind Chebbo, Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,084

(22) Filed: Jul. 25, 2017

(65) Prior Publication Data

US 2017/0325162 A1    Nov. 9, 2017

Related U.S. Application Data

(60) Division of application No. 14/790,504, filed on Jul. 2, 2015, now Pat. No. 9,749,950, which is a
(Continued)

(30) Foreign Application Priority Data

Jan. 10, 2013   (EP) ................................. 13150784

(51) Int. Cl.
*H04W 4/00*   (2018.01)
*H04W 52/02*   (2009.01)
(Continued)

(52) U.S. Cl.
CPC ....... *H04W 52/0209* (2013.01); *H04W 8/005* (2013.01); *H04W 36/0083* (2013.01);
(Continued)

(58) Field of Classification Search
CPC .................................................... H04W 88/06
See application file for complete search history.

(56) References Cited

U.S. PATENT DOCUMENTS

| 8,699,464 | B1 * | 4/2014 | Vivanco | H04W 28/0289 |
| | | | | 370/331 |
| 8,818,427 | B1 * | 8/2014 | Goyal | H04B 7/15507 |
| | | | | 455/458 |

(Continued)

FOREIGN PATENT DOCUMENTS

| JP | 2005-80197 | 3/2005 |
| JP | 2009-177765 | 8/2009 |
| JP | 2012-519440 | 8/2012 |

OTHER PUBLICATIONS

"Discussion on RAN enhancements for group paging in MTC", 3GPP TSG RAN WG2 #73bis, Apr. 11-15, 2011, Shanghai, China, pp. 1-3.

(Continued)

*Primary Examiner* — Farah Faroul
(74) *Attorney, Agent, or Firm* — Staas & Halsey LLP (57) ABSTRACT

A method of implementing multiple radio access technologies, RATs, by a multi-RAT wireless communication network and a wireless communication apparatus. The multi-RAT wireless communication network transmits, to the wireless communication apparatus, a signal relating to a second RAT using a first RAT. The wireless communication apparatus uses a first radio communication module configured to support the first RAT to receive the signal, and activates a second radio communication module configured to support the second RAT from a power saving in order to perform a function. The first RAT generally has lower power consumption in use at the wireless communication apparatus than that of the second RAT.

15 Claims, 6 Drawing Sheets

Related U.S. Application Data continuation of application No. PCT/EP2014/050179, filed on Jan. 8, 2014.

(51) Int. Cl.
*H04W 8/00* (2009.01)
*H04W 36/00* (2009.01)
*H04W 72/12* (2009.01)
*H04W 88/06* (2009.01)
*H04W 36/24* (2009.01)
*H04W 4/70* (2018.01)

(52) U.S. Cl.
CPC .......... *H04W 52/0216* (2013.01); *H04W 4/70* (2018.02); *H04W 36/24* (2013.01); *H04W 72/1215* (2013.01); *H04W 88/06* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/21* (2018.01); *Y02D 70/24* (2018.01)

(56) References Cited

U.S. PATENT DOCUMENTS

| | | | |
|---|---|---|---|
| 9,402,217 | B1 | 7/2016 | Khan |
| 2009/0176515 | A1* | 7/2009 | Willey ................ H04W 68/025 455/458 |
| 2009/0245206 | A1 | 10/2009 | Liu |
| 2010/0248750 | A1* | 9/2010 | Muller ................ H04W 68/02 455/458 |
| 2010/0284317 | A1* | 11/2010 | Chan .................. H04L 12/5692 370/311 |
| 2010/0285793 | A1* | 11/2010 | Yoon .................... H04W 48/16 455/422.1 |
| 2010/0317374 | A1* | 12/2010 | Alpert .................. H04W 68/02 455/458 |
| 2011/0014919 | A1* | 1/2011 | Otte .................. H04W 36/0061 455/442 |
| 2011/0122780 | A1* | 5/2011 | Nieminen ......... H04W 52/0232 370/252 |
| 2011/0212746 | A1 | 9/2011 | Sarkar et al. |
| 2011/0319073 | A1* | 12/2011 | Ekici .................... H04W 48/18 455/426.1 |
| 2012/0026941 | A1* | 2/2012 | Ahmad ................ H04W 48/16 370/328 |
| 2012/0063397 | A1 | 3/2012 | Abedi et al. |
| 2012/0164948 | A1* | 6/2012 | Narasimha ......... H04W 72/1215 455/63.1 |
| 2012/0250548 | A1* | 10/2012 | Swaminathan ... H04W 36/0083 370/252 |
| 2013/0150032 | A1 | 6/2013 | Pattaswamy |
| 2013/0241744 | A1 | 9/2013 | Erdos |
| 2013/0303214 | A1* | 11/2013 | Ahmadi ............ H04W 72/1215 455/501 |
| 2014/0112254 | A1 | 4/2014 | Lindoff |
| 2014/0126460 | A1 | 5/2014 | Bienas |
| 2014/0141781 | A1 | 5/2014 | Park |
| 2015/0257092 | A1 | 9/2015 | Zhao |
| 2016/0302140 | A1 | 10/2016 | Shaw |

OTHER PUBLICATIONS

Japanese Office Action dated May 17, 2016 in corresponding Japanese Patent Application No. 2015-546065.
International Search Report dated Mar. 21, 2014 in corresponding international application PCT/EP2014/050179.
European Search Report completed Sep. 4, 2013 in corresponding European application 13150784.0.
Jin, Tao, et al.; "WiZi-Cloud: Application-transparent Dual ZigBee-Wifi Radios for Low Power Internet Access" IEEE Infocom 2011, pp. 1593-1601.
U.S. Notice of Allowance dated Apr. 28, 2017 in U.S. Appl. No. 14/790,504.
U.S. Office Action dated Jan. 12, 2017 in U.S. Appl. No. 14/790,504.
U.S. Appl. No. 14/790,504, filed Jul. 2, 2015, Zhaojun Li, Fujitsu Limited.

* cited by examiner

MOBILITY AND CONNECTION MANAGEMENT OF LOW POWER WIRELESS COMMUNICATIONS APPARATUSES

CROSS REFERENCE TO RELATED APPLICATIONS

This application is a divisional of U.S. application Ser. No. 14/790,504, filed Jul. 2, 2015, which is a continuation of International Application No. PCT/EP2014/050179, filed Jan. 8, 2014, and claims the benefit of European Application No. 13150784.0, filed Jan. 10, 2013, the disclosures of all of which are incorporated herein by reference.

FIELD

The present invention generally relates to wireless communications, and in particular but not exclusively to mobility and connection management of low power wireless communications apparatuses.

BACKGROUND

Machine Type Communications (MTC) devices, sometimes also referred to as Machine-to-Machine (M2M) devices, are increasingly being used for a variety of applications. MTC is a form of data communication which involves one or more entities that do not necessarily need human interaction. In a wireless communication system, the number of MTC devices may be several orders of magnitude greater than 'traditional' devices. Many MTC devices will be relatively stationary and/or generate low volumes of traffic. Others, however, may be relatively mobile and may have the capability to generate normal quantities of signalling.

In the Third Generation Partnership Project (3GPP) Long Term Evolution (LTE) standard, support for MTC devices was introduced in release 9. Details of MTC devices as applied to LTE are given in the 3GPP standard TS22.368. In this context, the total signalling related to mobility and connection management for large numbers of MTC User Equipment (UE) is of potential concern in at least two situations:
- when an application (running on both an application server and many MTC devices at the same time) makes a request to "do something" via paging messages;
- when many MTC devices are roaming into a new Tracking Area (TA), and they need to perform a TA update, or be handed over to a new base station (known in LTE as an Evolved Node B, and abbreviated as eNodeB or eNB).

In addition, power consumption is of concern for many MTC devices. Based on current 3GPP standards, it consumes a significant amount of power for a UE to maintain connection with an eNB, either camping on or staying in connected mode. On the other hand, it takes a long time and also consumes a significant amount of power if the UE has to switch between idle mode and connected mode.

Accordingly, it is desirable to enable sufficient mobility and connection management without overloading the network and with lower power consumption.

SUMMARY

According to one embodiment, there is provided a method of implementing multiple radio access technologies, RATs, by a multi-RAT wireless communication network and a wireless communication apparatus, the method comprising the multi-RAT wireless communication network transmitting, to the wireless communication apparatus, a signal relating to a second RAT using a first RAT; and the wireless communication apparatus using a first radio communication module configured to support the first RAT to receive the signal, and activating a second radio communication module configured to support the second RAT from a power saving state in order to perform a function, wherein the first RAT generally has lower power consumption in use at the wireless communication apparatus than that of the second RAT.

Employing a RAT having low power consumption at the wireless communication apparatus means that the wireless communication apparatus can power down (switch off) or otherwise limit the use of the second radio communication module to achieve power savings. In other words, the second radio communication module need not be activated at scheduled instances to perform functions that may be defined by the second RAT. Instead, the wireless communication apparatus may choose to skip such activation instances and await the signal (which serves as a notification) received over the first RAT.

The function referred to above can be a management function defined by the second RAT, such as the mobility management function defined in LTE which is used for updating a current location of the wireless communications apparatus. Accordingly, in one embodiment the signal relates to at least one of mobility management of the wireless communication apparatus and connection management of the wireless communication apparatus. However, other functions are also contemplated.

In one embodiment, the signal relates to at least one of: paging of the wireless communication apparatus; location updating of the wireless communication apparatus; and handover in the multi-RAT wireless communication network. Location updating includes, for example, the tracking area updates defined by LTE. The handover may be between cells or networks employing the second RAT.

In one embodiment, the signal is transmitted in a beacon of the first RAT, for example either as a single data bit or several data bits. This reduces the amount of signalling required to notify the wireless communication apparatus.

In one embodiment, the function comprises monitoring for a transmission from the multi-RAT wireless communication network that is intended for the wireless communication apparatus. In this way, the second radio communication module can be activated only when there is a transmission intended for the wireless communication device.

The wireless communication apparatus may transmit a response to the transmission to the multi-RAT wireless communication network at a scheduled time using the second radio communication module. This ensures that, when a large amount of MTC devices transmit a response, the network does not become overloaded with signals and reduces collisions. A schedule defining the scheduled time may be common to some or all wireless communication apparatuses of the multi-RAT wireless communication network.

The term "multi-RAT wireless communication network" is used to denote the combined wireless communication systems available to the wireless communication apparatus within a given geographical area, except as demanded otherwise by the context. Exemplary wireless communications systems include wireless cellular systems. Accordingly, a connection with the wireless communications apparatus may need to be transferred between cells. In one embodiment, the signal is one of a plurality of signals relating to the second RAT transmitted by two or more cells in the multi-RAT wireless communication network to the wireless communication apparatus using the first RAT, and the function relates to handover between cells. For example, the plurality of signals may be transmitted by a plurality of base stations including a base station which is currently serving the wireless communication apparatus and a base station which neighbours the serving base station.

Signals received using the first RAT may provide an indication that handover may be required. In one embodiment, the wireless communication apparatus determines a communication quality of each of the plurality of signals received by the first radio communication module and, when the communication quality of a signal received from a neighbour cell is better than the communication quality of a signal received from a current serving cell of the wireless communication apparatus, the function comprises carrying out a measurement of communication quality using the second RAT.

In embodiments, a coverage area of the first RAT within the multi-RAT wireless communication network is smaller than a coverage area of a cell of the second RAT within the multi-RAT wireless communication network, preferably with the first RAT available at least near an edge of the coverage area of a cell of the second RAT. In the case of cellular wireless systems, for example, the first RAT may be available at cell edges in order to support handover functions. Inter-network handover between networks employing the second RAT may also, or alternatively, be supported.

Embodiments may be employed in different network topologies. For example, the first RAT in the multi-RAT wireless communication network may be supported by a low power wireless communication network comprising either a star topology having a coordinator node or a tree topology having a coordinator node and at least one router node. In the star topology the signal may be transmitted directly from the coordinator node directly to the wireless communication apparatus, whereas in the tree topology the signal may be transmitted over a router node. In the context of Zigbee, for example, the coordinator node may be a Personal Area Network (PAN) coordinator. In either topology, the different functions may be co-located in the same infrastructure node or provided as separate nodes.

The wireless communications apparatus can be any suitable apparatus, such as a mobile or cellular telephone, a smart phone, a personal digital assistant (PDA) device or other device, configured to support multiple RATs according to embodiments of the present invention. In one embodiment, the wireless communication apparatus is a machine-type communication, MTC, wireless communication apparatus.

In one embodiment, the first RAT comprises Zigbee and the second RAT comprises LTE. Thus, a Zigbee "beacon frame" may be used to convey specific indications to the wireless communications apparatus, for example, in order to provide a paging indication to an idle UE, perform a Tracking Area Update for an idle UE, and/or maintain an always connected state of a UE. For example, it is expected that power consumption associated with LTE idle mode could be reduced by a factor of between 10 and 100 by using a low power RAT such as Zigbee to convey paging indications or perform a Tracking Area Update. Other RATs could be employed as the first and second RATs, including GSM, GPRS, UMTS, WiMax (IEEE802.16), WiFi (IEEE802.11), and Bluetooth. The first and second RATs may generally be selected depending on the relative power consumptions. In such RATs, a wireless communication apparatus may variously be referred to as a terminal, a subscriber station or user equipment (UE) which communicates wirelessly with a base station (or access point).

According to one embodiment, there is provided a wireless communication system, comprising a multi-radio access technology, RAT, infrastructure node configured to transmit a signal relating to a second RAT using a first RAT; a wireless communication apparatus comprising: a first radio communication module configured to support a first RAT, a second radio communication module configured to support a second RAT, and a controller configured to activate the second radio communication module from a power saving state in response to the first radio communication module receiving the signal from the multi-RAT infrastructure node, wherein the first RAT generally has lower power consumption in use at the wireless communication apparatus than that of the second RAT.

According to one embodiment, there is provided a multi-radio access technology, RAT, infrastructure node, comprising a first communications unit configured to support a first RAT, a second radio communication unit configured to support a second RAT, wherein the first communications unit is configured to transmit a signal relating to the second RAT using the first RAT. Thus, the communication units of the first and second RATs may be co-located in an infrastructure node, for example an eNB additionally having low power system function, for which the eNB may act as a master.

According to one embodiment, there is provided a wireless communication apparatus, comprising a first radio communication module configured to support the first RAT; a second radio communication module configured to support the second RAT; and a controller configured to activate the second radio communication module from a power saving state in response to the first radio communication module receiving a signal relating to the second RAT that was transmitted by a multi-RAT infrastructure node using the first RAT, wherein the first RAT generally has lower power consumption in use at the wireless communication apparatus than that of the second RAT.

One embodiment provides a computer program product comprising computer executable instructions which, when executed by a computer, cause the computer to perform a method as set out above. The computer program product may be embodied in a carrier medium, which may be a storage medium or a signal medium. A storage medium may include optical storage means, or magnetic storage means, or electronic storage means.

The described embodiments may be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means.

Furthermore, any combinations of the described features, functions and/or operations can be provided.

Additional aspects and/or advantages will be set forth in part in the description which follows and, in part, will be apparent from the description, or may be learned by practice of the invention.

BRIEF DESCRIPTION OF THE DRAWINGS

Specific embodiments will be described in further detail below on the basis of the accompanying drawings, in which.

DETAILED DESCRIPTION

Figure 1:
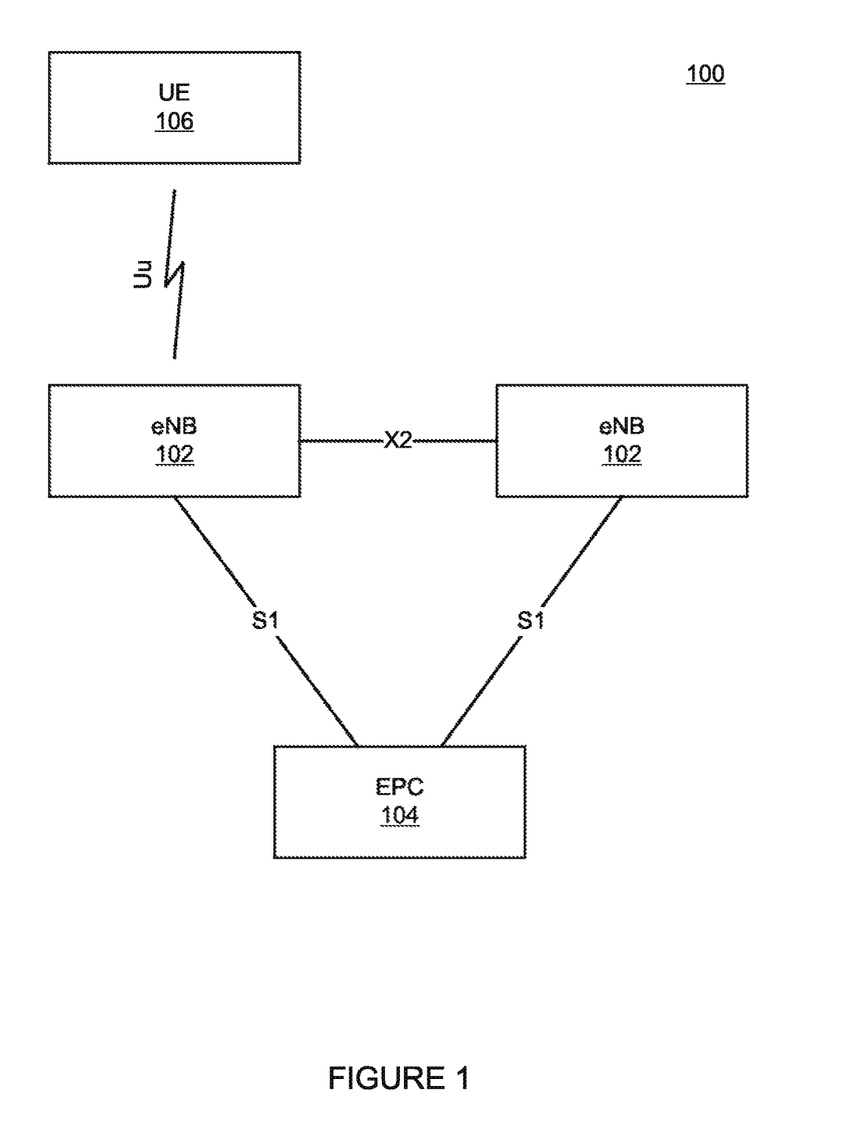
FIG. 1 is a schematic illustration of an LTE network.

FIG. 1 is a simplified schematic drawing of an LTE network 100 comprising a User Equipment (UE) 106, such as an MTC UE, two eNBs 102, and an Evolved Packet Core (EPC) 104. The eNBs 102 connect to the EPC 104 via S1 interfaces, and to each other via an X2 interface.

The functions of the eNBs 102 include radio resource management functions such as admission control, mobility control, radio bearer control, dynamic allocation of resources to the UE 106, and so on. Other functions include scheduling and transmission of the paging and broadcast messages, and measurement and reporting (e.g. for mobility and scheduling-related functions). The EPC 104 comprises a Mobility Management Entity (MME), a Serving Gateway (SGW), and a Packet Data Network Gateway (PGW) (these are not shown for reasons of clarity). The MME is responsible for functions such as mobility, intra-LTE handover, and tracking and paging procedures of User Equipments (UEs). The main purpose of the SGW is to route and forward user data packets among LTE nodes, and to manage handover among LTE and other 3GPP technologies. The PGW interfaces with external packet data networks such as the Internet. The PGW also performs several IP functions such as address allocation, policy enforcement, packet filtering and routing.

LTE specifies two radio resource control (RRC) states for UEs: RRC_IDLE and RRC_CONNECTED (herein referred to as idle and connected states for convenience). UEs in idle state do not have a dedicated connection with the network, although they can listen to broadcast channels, monitor the paging channel, perform neighbour cell measurements and cell selection and reselection, and receive system information.

Paging for IDLE MTC UEs

In LTE, UE paging is performed only in certain frames and subframes. The frames where paging is allowed are referred to as Paging Frames (PF) and the subframes are referred to as paging occasions (POs). Typically, the Downlink Control Information (DCI) containing the scheduling assignment for the paging message is transmitted over the physical downlink control channel (PDCCH). The scheduling assignment is common for all UE monitoring a certain PO. When a UE monitoring the POs detects the scheduling assignment, the UE demodulates and decodes the paging message sent on the physical downlink shared channel (PDSCH). The paging message contains information about the exact identity of the UE being paged. UEs that do not find their identities in the paging message discard the data and sleep. A UE recognizing its identity sends a service request to the MME. Several UEs may be addressed in the same paging message. Upon receipt of a paging message, the UE establishes a connection with the network, thus transitioning from idle to connected state.

Monitoring the paging channel increases power consumption at the UE. It would therefore be advantageous if the UE did not have to monitor the paging channel. On the other hand, the UE should have sufficient awareness to determine when there is a paging message for it. In embodiments, UEs (e.g. MTC UEs) are configured to support LTE as well as a low power RAT, such as IEEE802.15.4/Zigbee (also referred to herein as a low power system, LPS), with a paging indication carried out via the low power RAT, for example using a Zigbee beacon.

The IEEE 802.15.4 standard (which describes the Physical Layer and Medium Access Control) and ZigBee jointly specify a protocol stack for the development of short-range and low power communications for Wireless Personal Area Networks (WPANs). In Zigbee, low power consumption results from a low duty cycle, which refers to the active time as a proportion of the time interval between activity. In other words, a device on a ZigBee network does not need to keep in constant contact with the network to remain on the network, and is active for only a very small fraction of time. In particular, the 802.15.4 MAC layer defines two basic modes of operation: beacon mode and non-beacon mode. Beacon mode is timing dependent, where a beacon frame is sent out at some set interval defined by the implementation. The beacon defines the start of a superframe which is the interval between the beacons, and is used as a way for the devices on the network to synchronize with each other. The superframe is divided into two parts: the active part where data transfers occur, and the inactive part where the device can go to sleep. For very low power operation, it is possible to define the ratio of the active time to the inactive time to be very low so that a device spends most of its time sleeping.

Figure 2:
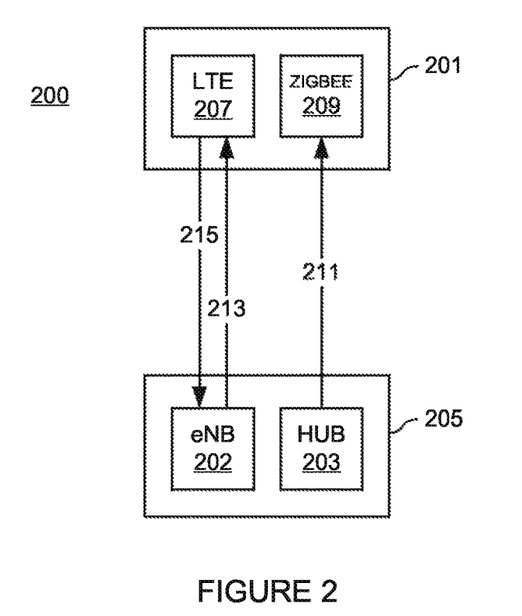
FIG. 2 schematically illustrates communication between a multi-RAT infrastructure node and a dual-mode wireless communication apparatus in accordance with an embodiment.

Referring now to FIG. 2, which schematically illustrates communication between a multi-RAT infrastructure node and a dual-mode wireless communication apparatus in accordance with an embodiment, a wireless communications network 200 includes a multi-RAT infrastructure node 205 and a dual-mode wireless communications apparatus 201. Here, the infrastructure node 205 comprises an eNB 202 and a co-located Zigbee hub 203, with the latter constituting the low power radio access technology. Even though eNB 202 and Zigbee hub 203 are shown as separate communications units, it will be appreciated that the functionality provided by them may be included within a single communications unit. For example, the infrastructure node 205 may be an eNB base station with low power radio access technology (IEEE802.15.4/Zigbee) functions. Furthermore, it will be understood that it is not necessary to deploy all of the functionality provided by a given low power radio access technology. The wireless communications apparatus 201 comprises an LTE module 207 and a Zigbee module 209.

Figure 4:
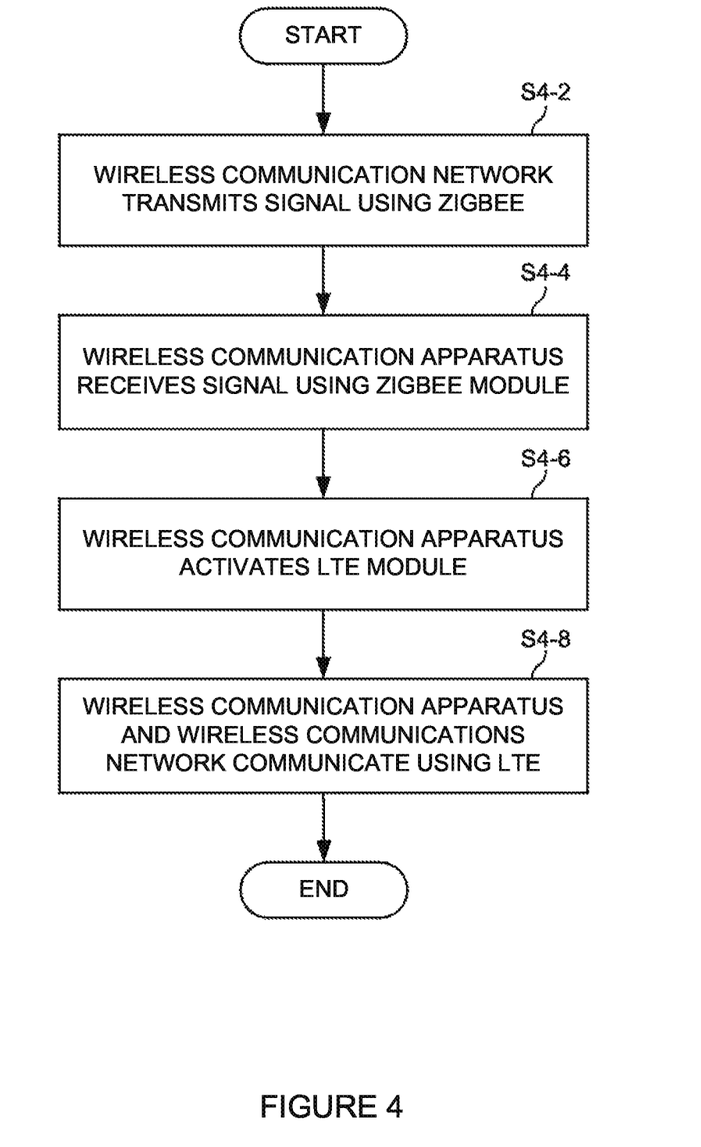
FIG. 4 is a flow diagram of a method of employing multiple RATs in a multi-RAT wireless communication network in accordance with an embodiment.

Referring now also to FIG. 4, when the eNB 202 receives a paging message for a UE in its coverage area, such as UE 201, the eNB 202, instead of constructing an LTE paging message, forwards the paging message to the Zigbee communication unit 203. Alternatively, the eNB 202 may store the paging message for later transmission, with the Zigbee communication unit 203 informed and/or instructed accordingly by the eNB 202 (or another unit such as the controller 821 shown in FIG. 8). The Zigbee communication unit then sends out a beacon 211 to the UE, for example with a "wake up indication" (step S4-2). Upon the receipt of the beacon using the Zigbee radio communications module 209 (step S4-4), the UE activates the LTE radio communications module (step S4-6) in order to receive the full paging information 213 from the infrastructure node 205 (step S4-6).

In this way, the LTE radio communications module 207 of the UE 201 can be switched into a "deep sleep" mode with long "off" periods without having to periodically monitor the aforementioned paging channel (PCH), while the Zigbee radio communications module 209 remains relatively active, i.e. monitoring for beacons from the infrastructure node 205.

It will be appreciated that Zigbee communication unit 203 may broadcast beacons with paging indications to multiple MTC UEs. Responses 215 from these MTC UEs, including UE 201, to the paging information 213 can therefore be scheduled for different times in order to avoid many MTC devices accessing the LTE network at the same time.

Tracking Area Update for IDLE mode MTC UEs

In the previously described embodiment, a Zigbee beacon is used to provide an indication that a paging message is waiting to be transmitted to the UE. In other embodiments, the beacon is used not simply to provide such an indication but to provide at least some information that would otherwise be provided by certain messages, such as Tracking Area (TA) information.

In LTE idle mode, the location of a UE within the LTE network is known on a TA granularity. The TA is a logical grouping of cells in LTE networks that are tracked by the MME in the network, as briefly mentioned previously. The TA therefore manages and represents the location of UEs. Typically, in order to keep its location updated in the MME, a UE needs to perform a Tracking Area Update (TAU) procedure every time it enters a new TA. When the network needs to forward an incoming voice call or data packet to a UE in idle mode, the MME locates the UE by sending paging messages (as described above) to all cells in the UE's last registered TA.

In embodiments, the detection of a new Tracking Area can be achieved using the low power RAT (Zigbee).

Referring again to FIGS. 2 and 4, in this case the co-located Zigbee communications unit 203 sends out a beacon 211 to the MTC UE 201 (step S4-2), but this time with tracking area information, such as a "TA Id". The Zigbee radio communications module 209 of the UE 201 receives the beacon 211 (Step S4-4), may switch on the LTE radio communications module 207 (S4-6) and, if necessary, may perform a tracking area update procedure (step S4-8). As in the previously described embodiments, the LTE communications module 209 of such MTC UEs 201 can be switched into a "deep sleep" mode with a long "off" period, in this case without having to monitor the Broadcast Channel (BCH). Once again, the Zigbee communications module 209 is relatively active, e.g. monitoring for beacons from the infrastructure node 205.

CONNECTED Mode MTC UEs

As noted earlier, LTE defines idle and connected states for UEs. Attention is now turned to the connected state, in which UEs have allocated radio resources in shared data channels, specified by dedicated signalling performed via control channels. Also, in this state, the UE periodically reports downlink channel quality to eNB, as well as neighbouring cells information including cells using other frequencies or RATs.

LTE also defines a power saving mechanism in the form of Discontinuous Reception (DRX) during which a UE is alternatively in an active period and a sleep period. Specifically, the DRX mode is a mode where the power consumption of a UE is reduced by making the UE monitor a channel and receive downlink traffic at given periods which are negotiated by the UE with an eNB, so as to reduce unnecessary time for monitoring the channel. DRX functionalities can be implemented not only in the idle state but also in the connected state. The DRX functionality in the connected state provides two DRX cycles that can be set for each UE, namely a short DRX cycle and a long DRX cycle having a longer "off" duration than the short DRX cycle. For example, long DRX cycles in LTE can be defined in the range of 10 ms to 2560 ms.

Embodiments provide that the low power radio communications module of the MTC UE remains in the connected mode for a long period, for which the network always keeps sufficient UE context so that the UE does not have to perform procedures in order to re-connect from idle to the network. However, to reduce power consumption it is desirable for the UE to remain in a power saving mode for as long as possible. Thus, a Zigbee radio communications module is implemented which remains relatively active, monitoring for beacons transmitted by an infrastructure node. These beacons provide LTE-related information. This allows an "extra long" DRX mode to be used during which an LTE communications module of the MTC UE stays in connected but OFF mode most of time, e.g. for hours or even days.

Referring once again to FIGS. 2 and 4, when there is downlink (DL) packet coming for such UEs 201 for example, the indication of DL packet delivery for the low power UEs can be carried over Zigbee. In this case the Zigbee beacon 211 is used to inform the LTE interface 207 of the DL packet arrival (S4-4). Upon receipt of the beacon 211 (step S4-6), the UE 201 wakes up the LTE module 207 from the DRX mode (step S4-6) and uses it to receive the data 213 over LTE (step S4-8).

Figure 5:
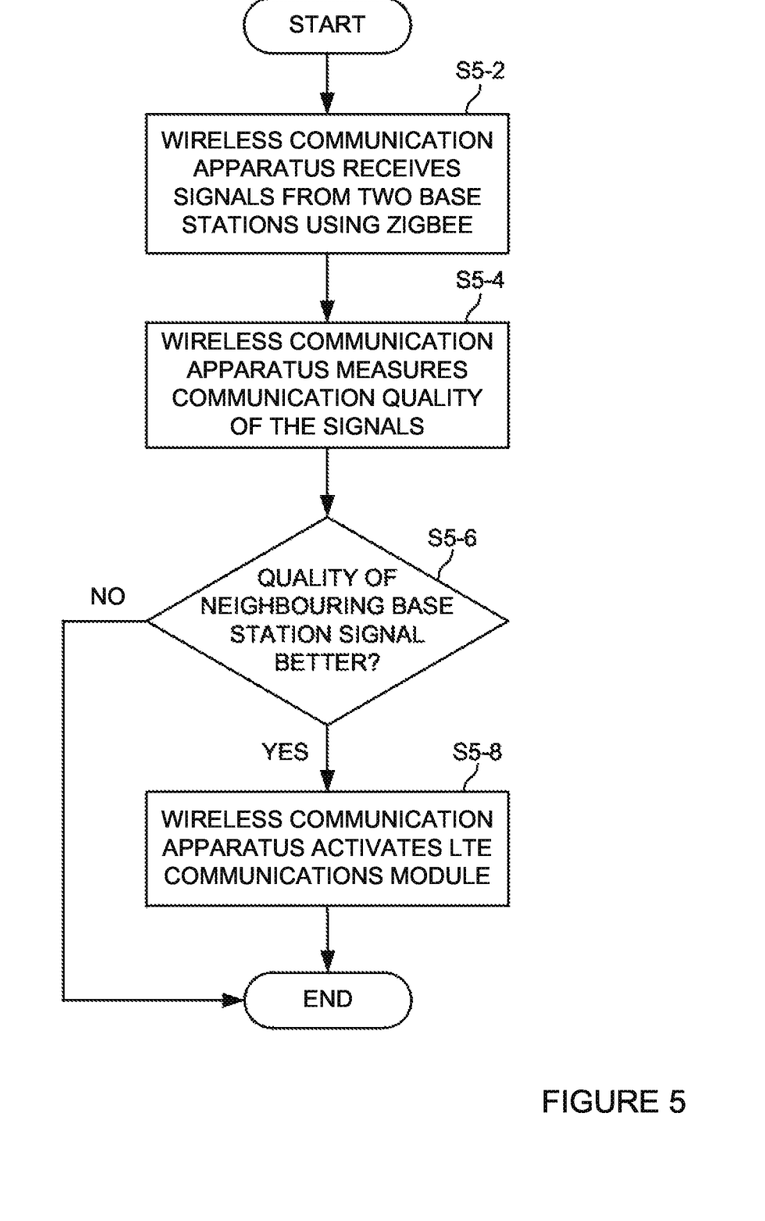
FIG. 5 is a flow diagram of a handover related procedure employing multiple RATs in a multi-RAT wireless communication network in accordance with an embodiment.

In addition to providing downlink packet notification, the low power RAT (Zigbee) may be utilised in order to support (cell or network) handover. With reference to FIG. 5, an exemplary process is as follows:

Step S5-2: the MTC UE receives signals, for example in the form of Zigbee beacons, from both a current serving base station and a neighbouring base station.

Step S5-4: the Zigbee radio communications module of the MTC UE performs a measurement on the received signals, for example to determine reception quality.

Steps S5-6 and S5-8: since the reception quality of the signals may be indicative of potential reception quality of LTE signals transmitted by the base stations, when the reception quality of the signal of the neighbouring base station is better than that of the serving base station, the LTE radio communications module of the MTC UE is activated to perform an LTE-related measurement, such as a signal quality measurement, and report to the eNB, which may in turn trigger a handover procedure.

In embodiments, in order to assist with handover the Zigbee radio communications module of the infrastructure node may be available only for MTC UEs at an LTE cell edge in the case the coverage footprint of Zigbee is smaller than that of the LTE (e.g. macro cell, micro cell or even pico cell). For example, a Zigbee tree topology may be deployed in order to enable Zigbee communications between a Zigbee hub co-located in an LTE eNB and an MTC device located at the cell edge via Zigbee router nodes.

Coverage: LTE cell vs. Zigbee Topologies

Zigbee supports three types of topologies: star topology, peer-to-peer topology, and cluster tree topology. In the star topology, communication is established between devices and a single central controller, called the personal area network (PAN) coordinator. In the peer-to-peer topology, there is also one PAN coordinator, but in contrast to the star topology, any device can communicate with any other device as long as they are in range of one another. The cluster-tree network is a special kind of peer-to-peer network in which most devices are "full-function devices", any of which can act as a coordinator and provide synchronization services to other devices and coordinators. Only one of these coordinators, however, is the PAN coordinator. The PAN coordinator forms the first cluster by establishing itself as the cluster head (CLH) with a cluster identifier (CID) of zero, choosing an unused PAN identifier, and broadcasting beacon frames to neighboring devices. A candidate device receiving a beacon frame may request to join the network at the CLH. If the PAN coordinator permits the device to join, it will add this new device as a child device in its neighbor list. The newly joined device will add the CLH as its parent in its neighbor list and begin transmitting periodic beacons such that other candidate devices may then join the network at that device. Once application or network requirements are met, the PAN coordinator may instruct a device to become the CLH of a new cluster adjacent to the first one.

In embodiments, the topology of the low power network in the multi-RAT wireless communications system depends on the size of the LTE cells.

Figure 6:
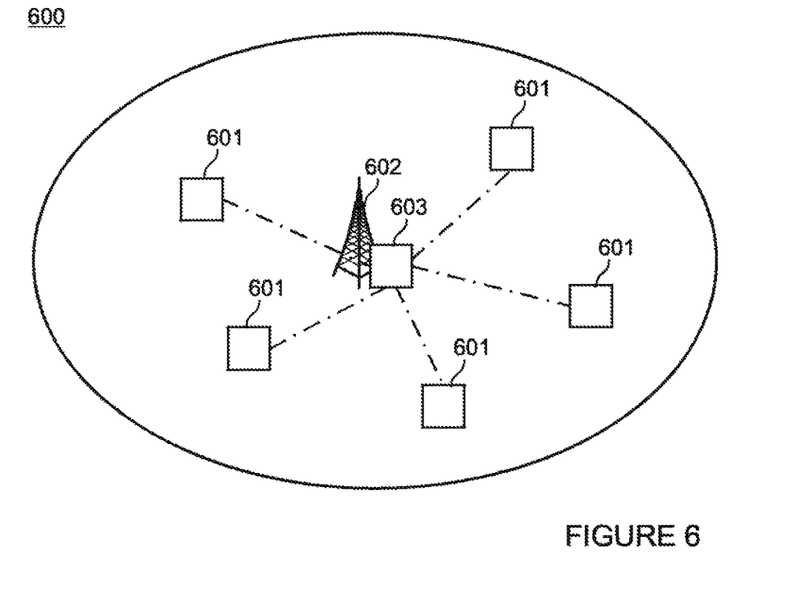
FIG. 6 is a schematic diagram of a multi-RAT wireless communication network in which a wireless communication system supporting a low power RAT is deployed in a star topology in accordance with an embodiment.

FIG. 6 schematically shows an embodiment of a multi-RAT wireless communications network 600 comprising an LTE system with a cell size that substantially corresponds to the coverage area provided by a Zigbee system having a star topology. In the network 600 of FIG. 6, Zigbee communication is established between devices 601 and the single central controller 603, which is co-located in the eNB 602. Accordingly, communications may proceed as described with reference to FIG. 2.

Figure 7:
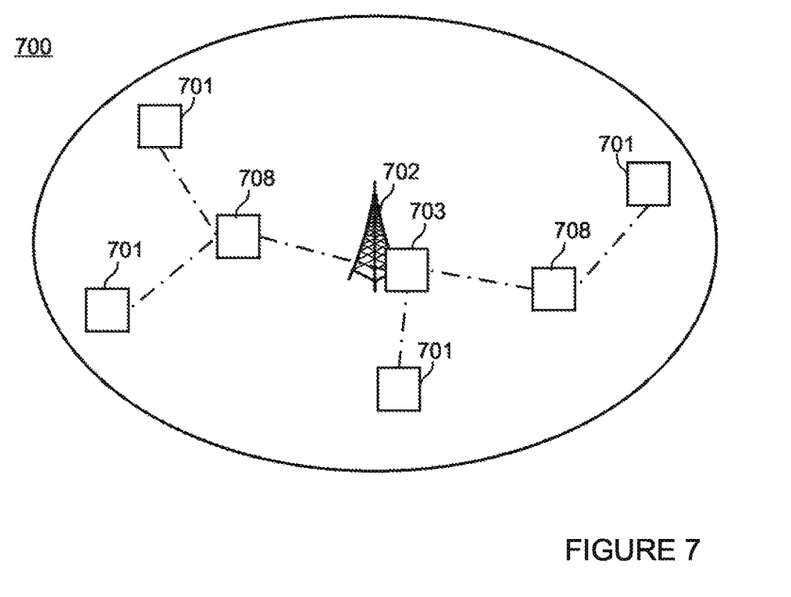
FIG. 7 is a schematic diagram of a multi-RAT wireless communication network in which a wireless communication system supporting a low power RAT is deployed in a tree topology in accordance with an embodiment.

FIG. 7 schematically shows an embodiment of a multi-RAT wireless communications network 700 comprising an LTE system with a cell size that is greater than can be provided by a Zigbee system having a star topology. Instead, the Zigbee system may operate in the cluster tree topology. Here, the co-located Zigbee function 703 in the eNB 702 acts as the first PAN coordinator, which forms the first cluster by connecting all the secondary coordinators 708. The secondary coordinators 708 can be distributed Zigbee master functions inside different physical devices. Alternatively, the first coordinator 708 can choose more capable devices as secondary coordinators (for example, the head of a group of MTC devices). In order to extend the coverage of the Zigbee network, the first coordinator may instruct the secondary coordinators 708 to form a new cluster adjacent to the first one. The cluster tree topology may have an increase in message latency with the advantage of increased coverage.

Figure 3:
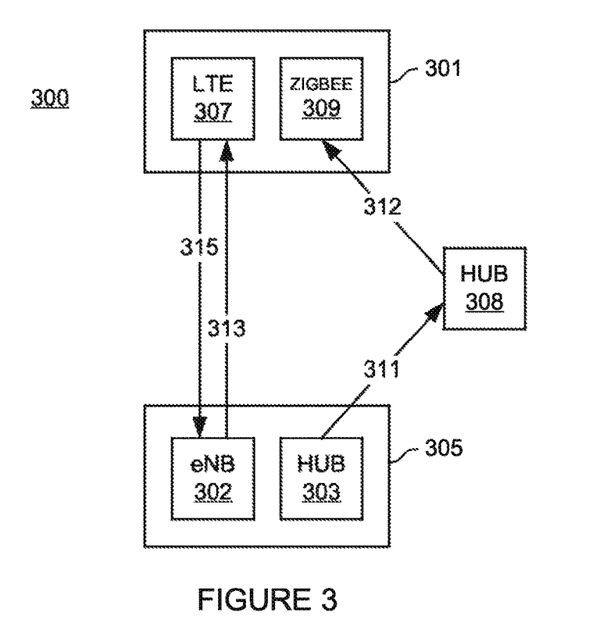
FIG. 3 schematically illustrates communication between a multi-RAT infrastructure node and a dual-mode wireless communication apparatus in accordance with an embodiment.

Referring also to FIG. 3, when an eNB 302, 702 receives a paging message for a UE 301, 701 in its coverage, the eNB 302, 702 forwards the message to the Zigbee communications unit 303, 703 (first PAN coordinator) co-located with the eNB 302, 702 in the infrastructure node 305. In contrast to the star topology, where the PAN coordinator then sends out "beacon" to the UEs, for example with "wake up indication", in the tree topology the first coordinator 303, 703 can send the paging to a secondary coordinator 308, 708 and each secondary coordinator 308, 708 is in charge of distributing the paging in its cluster.

Figure 8:
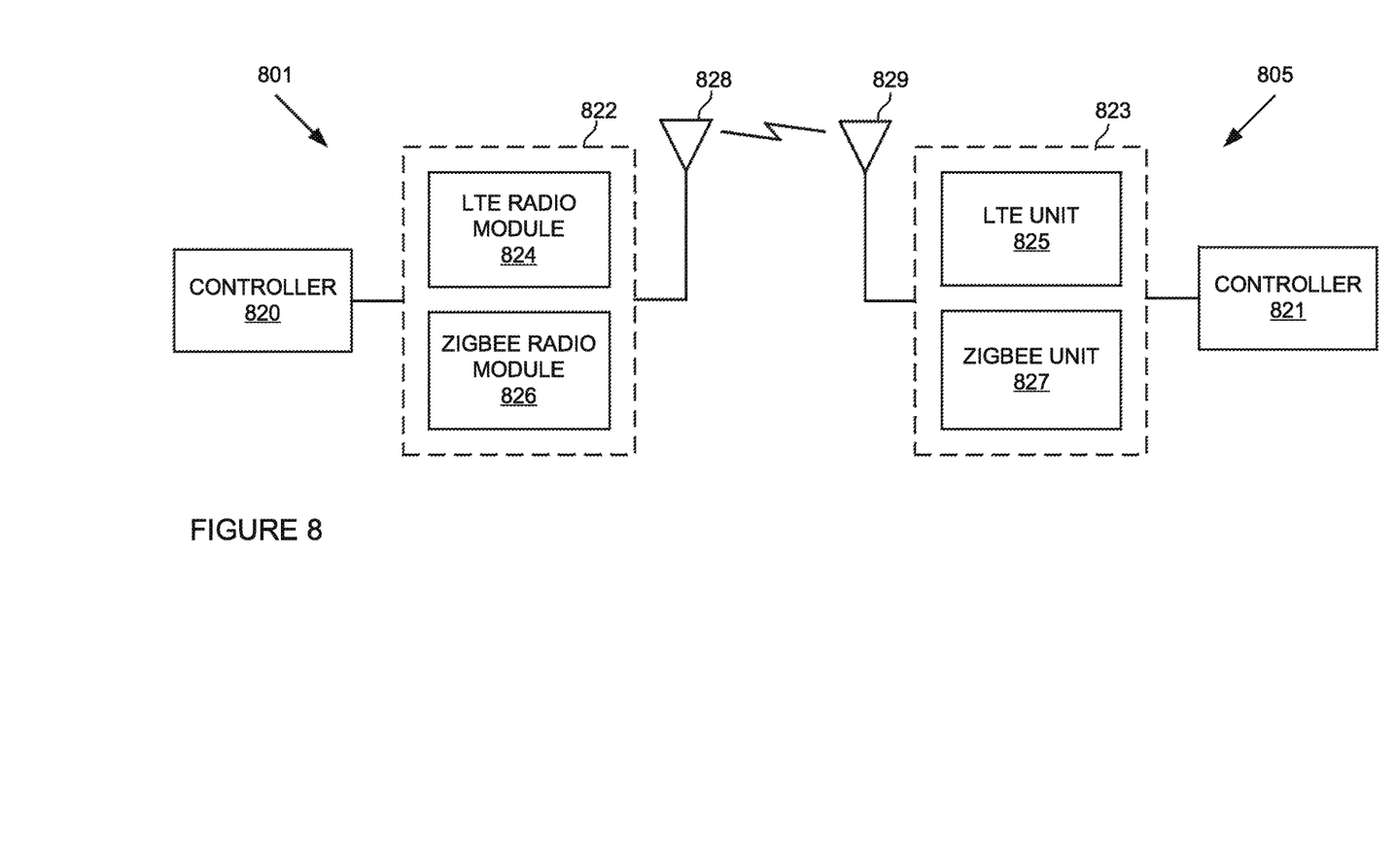
FIG. 8 is a functional block diagram of a multi-RAT infrastructure node and a dual-mode wireless communication apparatus in accordance with an embodiment.

FIG. 8 is a schematic drawing of a wireless communication system comprising a multi-RAT infrastructure node 801 and a dual-mode wireless communication apparatus 805.

The multi-RAT infrastructure node 805 comprises a controller 821 and a communications unit 823, which comprises an LTE communication unit 825 and a Zigbee communications unit 827. The controller 821 is configured to select the RAT for use in communications with the dual-mode wireless communication apparatus 801 using antenna (or a set of antennas) 829. As noted earlier, the multi-RAT infrastructure node 805 may be implemented as an eNB with Zigbee functionality. The controller 821 may be implemented as one or more processors.

The dual-mode wireless communication apparatus 801 includes a controller 820 and a communications unit 822, which comprises an LTE radio communications module 824 supporting LTE and a Zigbee radio communications module 826 supporting Zigbee. The controller 820 is configured to manage the radio communication modules, performing functions such as instructing the LTE radio communications module 824 to transition from one state to another in response to receiving a signal from the multi-RAT infrastructure node 805. Communication with the multi-RAT infrastructure node 801 is achieved using antenna (or a set of antennas) 828. The controller 820 may be implemented as one or more processors.

While certain embodiments have been described, these embodiments have been presented by way of example only, and are not intended to limit the scope of the inventions. Indeed, the novel devices, methods, and products described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of implementing multiple radio access technologies (RATs) by a multi-RAT wireless communication network and a wireless communication apparatus, the method comprising:

transmitting, by the multi-RAT wireless communication network, to the wireless communication apparatus, a signal to wake up a second RAT using a first RAT; and using, by the wireless communication apparatus, a first radio communication module configured to support the first RAT to receive the signal, and activating a second radio communication module configured to support the second RAT from a power saving state to monitor for a transmission from the multi-RAT wireless communication network;

transmitting, by the wireless communication apparatus, to the multi-RAT wireless communication network, a response to the transmission using the second radio communication module, wherein the first RAT having lower power consumption in use at the wireless communication apparatus than power consumption of the second RAT.

2. The method according to claim 1, wherein the signal relates to at least one of:
   mobility management of the wireless communication apparatus; and
   connection management of the wireless communication apparatus.

3. The method according to claim 2, wherein the signal relates to at least one of:
   paging of the wireless communication apparatus;
   location updating of the wireless communication apparatus; and
   handover in the multi-RAT wireless communication network.

4. The method according to claim 1, wherein the signal is transmitted in a beacon of the first RAT.

5. The method according to claim 1, wherein the response is transmitted at a scheduled time.

6. The method according to claim 1, wherein the signal is one of a plurality of signals relating to the second RAT transmitted by two or more cells in the multi-RAT wireless communication network to the wireless communication apparatus using the first RAT, and wherein the function relates to handover between cells.

7. The method according to claim 6, wherein the wireless communication apparatus determines a communication quality of each of the plurality of signals received by the first radio communication module and, when the communication quality of the signal received from a neighbour cell is better than the communication quality of the signal received from a current serving cell of the wireless communication apparatus, carrying out a measurement of communication quality using the second RAT.

8. The method according to claim 1, wherein a coverage area of the first RAT within the multi-RAT wireless communication network is smaller than a coverage area of a cell of the second RAT within the multi-RAT wireless communication network.

9. The method according to claim 8, wherein the first RAT being available at least near an edge of the coverage area of a cell of the second RAT.

10. The method according to claim 1, wherein the first RAT in the multi-RAT wireless communication network is supported by a low power wireless communication network comprising one of a star topology having a coordinator node and a tree topology having the coordinator node and at least one router node.

11. The method according to claim 1, wherein the wireless communication apparatus is a machine-type communication (MTC) wireless communication apparatus.

12. The method according to claim 1, wherein the first RAT comprises Zigbee and the second RAT comprises Long Term Evolution (LTE).

13. A wireless communication system, comprising:
   a multi-radio access technology (RAT) infrastructure node configured to use a first RAT to transmit a signal to wake up a second RAT; and
   a wireless communication apparatus, comprising:
      a first radio communication module configured to support the first RAT,
      a second radio communication module configured to support the second RAT, and
      a controller configured to activate the second radio communication module from a power saving state, in response to the first radio communication module receiving the signal from the multi-RAT infrastructure node,
      wherein, when activated, the second radio communication module is configured to monitor for a transmission from the multi-RAT wireless communication network and to transmit a response to the transmission to the multi-RAT wireless communication network, and
   wherein the first RAT having lower power consumption in use at the wireless communication apparatus than the power consumption of the second RAT.

14. A multi-radio access technology (RAT) infrastructure node, comprising:
   a first radio communications unit configured to support a first RAT, and
   a second radio communication unit configured to support a second RAT,
   wherein the first communications unit is configured to use the first RAT to transmit, to a first radio communication module of a wireless communication apparatus, a signal to wake up a second radio communication module of the wireless communication apparatus, the first radio communication module configured to support the first RAT and the second radio communication module configured to support the second RAT, and
   wherein the second radio communication unit of the multi-RAT infrastructure node is configured to receive a response from the wireless communication apparatus after the first communications unit of the multi-RAT infrastructure node has transmitted the signal to wake up the second radio communication module of the wireless communication apparatus.

15. A wireless communication apparatus, comprising:
   a first radio communication module configured to support a first RAT (multi-radio access technology);
   a second radio communication module configured to support a second RAT; and
   a controller configured to activate the second radio communication module from a power saving state in response to the first radio communication module receiving a signal to wake up the second RAT transmitted by a multi-RAT infrastructure node using the first RAT,
   wherein, when activated, the second radio communication module is configured to monitor for a transmission from the multi-RAT infrastructure node and to transmit a response to the transmission to the multi-RAT infrastructure node, and
   wherein the first RAT having lower power consumption in use at the wireless communication apparatus than the power consumption of the second RAT.

* * * * *